United States Patent [19]
Zaremsky

[11] Patent Number: 5,255,761
[45] Date of Patent: Oct. 26, 1993

[54] AIRCRAFT BRAKE

[75] Inventor: Gary J. Zaremsky, Yellow Springs, Ohio

[73] Assignee: The B.F. Goodrich Company, Akron, Ohio

[21] Appl. No.: 793,907

[22] Filed: Nov. 18, 1991

Related U.S. Application Data

[63] Continuation of Ser. No. 454,480, Dec. 21, 1989, abandoned.

[51] Int. Cl.$^5$ .............................................. F16D 55/40
[52] U.S. Cl. .................. 188/71.5; 188/18 A; 192/30 V; 192/70.17; 403/224; 411/544; 411/915
[58] Field of Search .............. 188/18 A, 71.1, 71.5, 188/73.35, 73.36, 73.37, 218 A, 218 XL, 264 E, 264 B, 268, 379; 192/30 V, 70.17; 403/224, 408.1; 411/542, 544, 907, 915

[56] References Cited

U.S. PATENT DOCUMENTS

| | | | |
|---|---|---|---|
| 1,881,127 | 10/1932 | Paton et al. | 192/70.17 |
| 2,071,788 | 2/1937 | Gillett | 188/71.5 X |
| 2,250,343 | 7/1941 | Zigler | 411/915 X |
| 2,928,504 | 3/1960 | Hahn et al. | 188/71.5 |
| 2,955,677 | 7/1958 | Jones . | |
| 3,895,693 | 7/1975 | Lucien et al. | 188/71.5 X |
| 4,475,634 | 10/1984 | Flaim et al. | 188/73.35 X |
| 4,585,096 | 4/1986 | Bok | 188/71.5 X |
| 4,796,728 | 1/1989 | Kanengieter et al. . | |
| 4,865,163 | 9/1989 | Kondo | 192/30 V X |

FOREIGN PATENT DOCUMENTS 134177 11/1978 Japan .................................. 188/71.1

*Primary Examiner*—George A. Halvosa
*Attorney, Agent, or Firm*—Joseph Januszkiewicz

[57] ABSTRACT

An aircraft wheel and brake assembly having an axle with a circular flange in abutting contact with an annular viscoelastic vibration dampening plate which in turn abuts an annular flange of a torque tube. The flanges are rigidly secured to the dampening plate which is solid. The torque tube supports for axial movement a Plurality of stator discs which are interleaved with a plurality of rotor discs, such rotor discs being axially slidable but connected to the rotatable wheel and wheel support which is journaled for rotation on the axle. Variations of the location of such dampening plate include locating such plate between the torque tube and the motive drive piston which actuates the frictional engagement of the rotor and stator discs to effect a braking action.

11 Claims, 5 Drawing Sheets

AIRCRAFT BRAKE

This is a continuation of pending application Ser. No. 07/454,480 Dec. 31, 1989, now abandoned.

BACKGROUND OF THE INVENTION

This invention relates to a friction aircraft braking system and more particularly to a new and improved aircraft friction disc braking system having vibration dampening means.

During the braking of an aircraft, the alternately splined stator and rotor discs are brought into sliding contact with each other generating heat and vibration within the braking system. The rotary and stator discs which can be made of metal or carbon must withstand the high heat build-up in such brakes as well as the vibration that occurs therein, which vibration creates noise, reduces the brake lining life and can effect structural fatigue. The present invention is directed to a simple expedient of dampening the vibration by installing a viscoelastic plate member along the transmission path of the vibration mode as between the brake discs and the supporting structure to isolate the brake discs from the supporting structures to enhance overall structural performance while significantly reducing the vibrations.

The viscoelastic Plate member of the invention is an elastic deformable member that yields but recovers its shape and form upon cessation of the stresses of vibration, which plate member dissipates the mechanical energy into heat.

SUMMARY OF THE INVENTION

The present invention is directed to an aircraft multiple disc brake assembly having a viscoelastic dampening plate for use between the axle flange and the torque tube wherein the torque tube supports for axial movement only a plurality of axially spaced stator discs which are interleaved with a Plurality of axially spaced rotor discs, which in turn are supported and connected for rotation with the wheel assembly that is mounted for rotation on the axle. A plurality of motive drive means are connected to the interleaved discs to effect axial displacement for frictional engagement of the discs. The dampening plate is a solid elastic deformable annular member.

DETAILED DESCRIPTION

Figure 1:
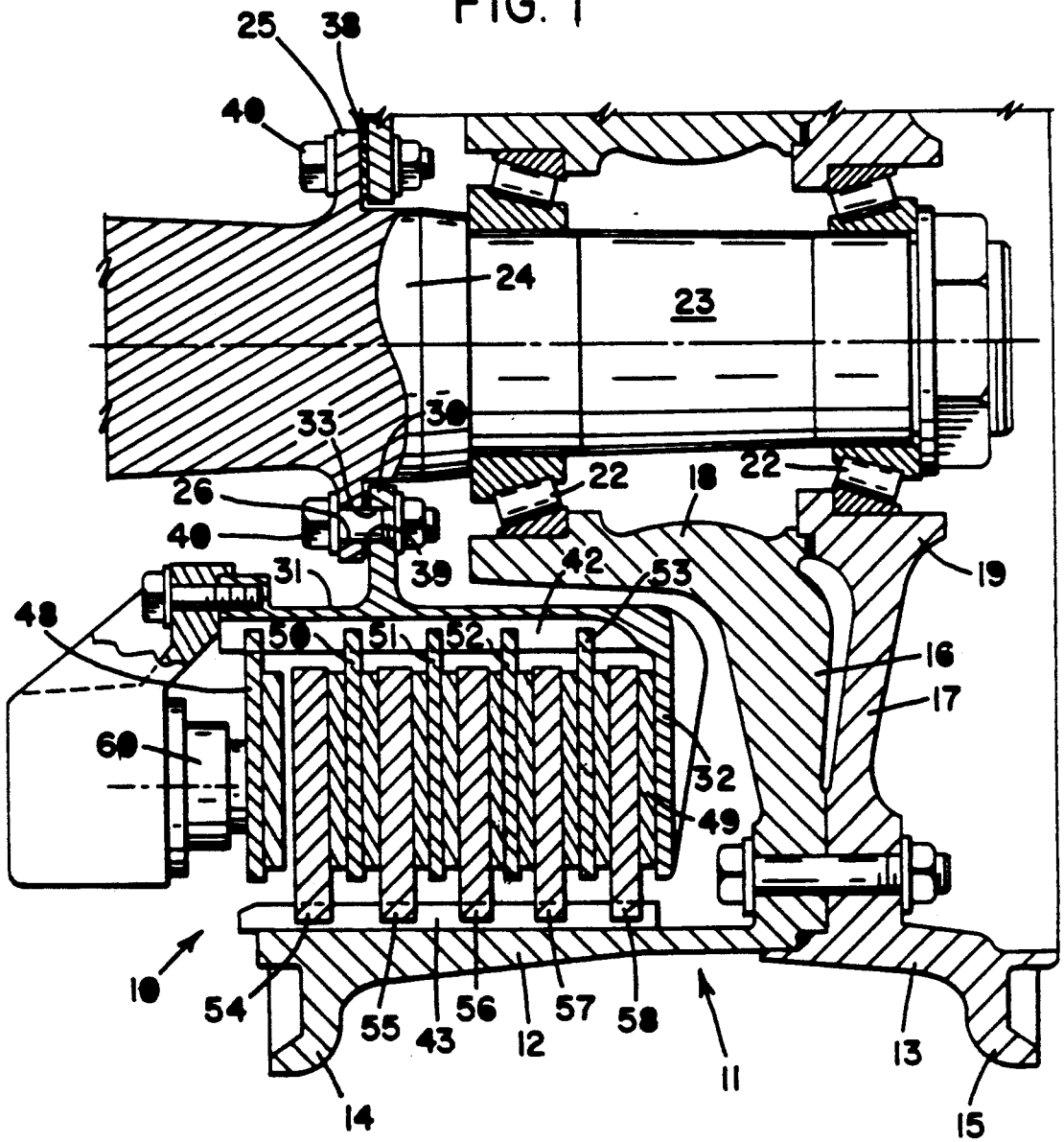
FIG. 1 is a fragmentary cross-sectional view of a brake assembly embodying the invention (vibration dampening plate) as mounted on an aircraft installation.
Figure 2:
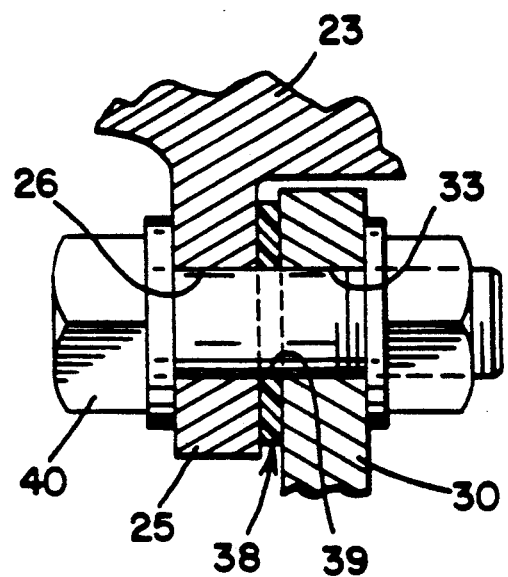
FIG. 2 is an enlarged cross-sectional view of the axle flange and its connection to the torque tube flange with a viscoelastic plate interposed therebetween.
Figure 3:
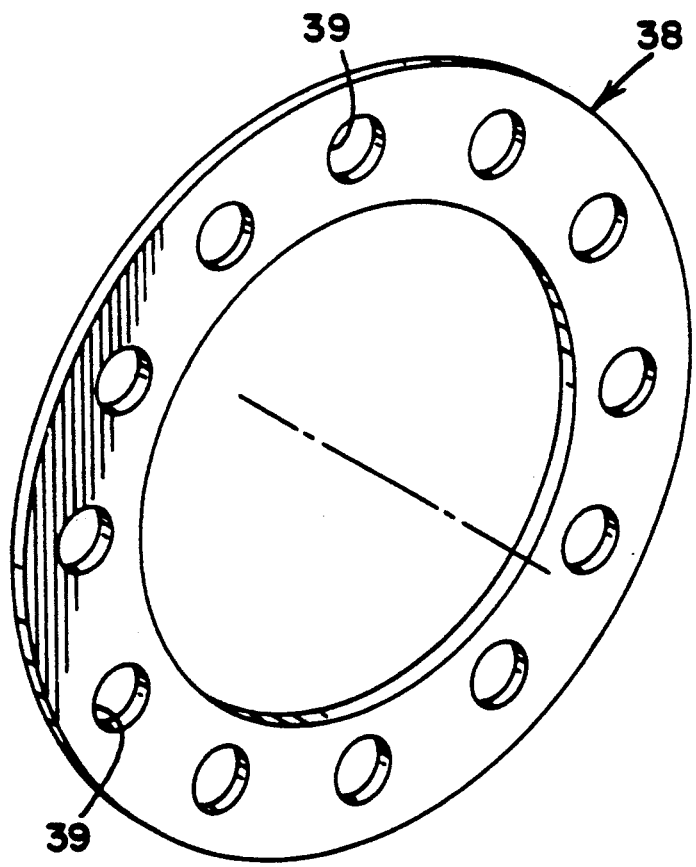
FIG. 3 is an isometric view of the viscoelastic dampening plate.

Referring to the drawings, wherein like reference numerals designate like or corresponding parts throughout the several views, there is shown in FIG. 1 a friction brake mechanism 10 for use with a cylindrical wheel 11 having matching wheel sections 12 and 13. Each of the wheel sections 12 and 13 has a rim member 14 and 15, web member 16 and 17, and hub members 18 and 19. The wheel sections 12 and 13 are fastened together by suitable bolts disposed in aligned bores within web members 16 and 17 to form an integral unit therewith.

The hub members 18 and 19 are supported for rotation on bearings 22 which are mounted on a nonrotatable axle member 23. Mounted on a cylindrical boss 24 of axle member 23 is a torque flange 25. Torque flange 25 has a plurality of circumferentially spaced bores 26 for securing such flange to a torque tube member to be described. Torque flange 25 supports and is connected to an annular flange 30 of a cylindrical torque tube member or torque tube 31, which torque tube member 31 has an annular and radially outwardly extending reaction plate or reaction member 32. Such annular flange 30 has a plurality of circumferentially spaced bores 33 which are in alignment with the bores 26 on torque flange 25. The reaction Plate 32 may be made integral with the torque tube member 31 or may be made as a separate annular piece and suitably connected to the torque tube or torque tube member 31.

An annular disc or plate member 38 made from a solid non-consumed single layer non-laminate or a solid non-consumed multi-layered laminate of viscoelastic material is received between the annular flange 30 and the torque flange 25. Annular disc 38 has a plurality of circumferentially spaced bores 39 in alignment with bores 26 of torque flange 25 and bores 33 of annular flange 30 such as to facilitate the reception of bolts 40 that extend through these bores 26 and 33 to interconnect the torque flange 25 with annular flange 30 of cylindrical torque tube member 31. The thickness of viscoelastic annular disc or plate member 38 is approximately 0.050" (0.1270 cm) and would thus leave an axial clearance space between flange 30 and flange 25. Such thickness of the viscoelastic annular plate member 38 may be in a range from 0.100" to 0.001" (0. 254 cm to 0.0254 cm).

Torque tube 31 has a plurality of circumferentially spaced splines or spline members 42 which are axially extending. Wheel section 12 has a plurality of circumferentially spaced ribs or splines 43 on its inner peripheral surface, which may be cast therein or may be machined to provide an integral type rib or spline for the brake assembly.

Spline members 42 support an axially nonrotatable end disc 48 and inner discs 50, 51, 52 and 53. All of such nonrotatable discs 48, 51, 50, 52 and 53 have slotted openings at circumferentially spaced locations on the inner periphery for captive engagement by the spline members 42 as is old and well known in the art. Such discs 48, 50, 51, 52 and 53 constitute the stators for friction brake 10. An annular disc or annular braking element 49 is suitably adhered to the inner surface of the reaction plate 32 and acts in concert with the stator discs 48, 50, 51, 52 and 53.

A plurality of axially spaced discs 54, 55, 56, 57 and 58 interspaced or interleaved between the stator discs 48 through 53, have a plurality of circumferentially spaced openings along their outer periphery for engagement by the corresponding ribs 43 as is old and well known in the art thereby forming the rotor discs for the friction brake 10. All of the nonrotatable discs (48, 50, 51, 52, 53), annular disc 49, and rotatable discs (54 through 58) may be made from a suitable brake material such as metal, steel or other wear-resistant material for withstanding high temperatures and providing a heat sink. The number of discs may be varied as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots as is old and well known in the art. Such reinforcing inserts are also referred to as drive clips.

The actuating mechanism for the brake includes a plurality of circumferentially spaced cylinders 60 suitably connected to the torque tube 31. Within each of the cylinders 60 is a hydraulic piston connected to piston rod which is operative to move the stator disc 48 axially into and out of engagement with the rotatable disc 54 which in turn operates to have all of the brake disc to frictional engage their radial surfaces and are resisted by the end stationary annular disc 49 and the reaction plate 32 on torque tube 31. During this period of brake disc engagement the friction forces among all the rotatable and non-rotatable discs may cause vibration within the discs and the adjacent structures unless dampened. It is the frictional engagement of these stator and rotor discs which produces the braking action for the aircraft wheel.

Figure 7:
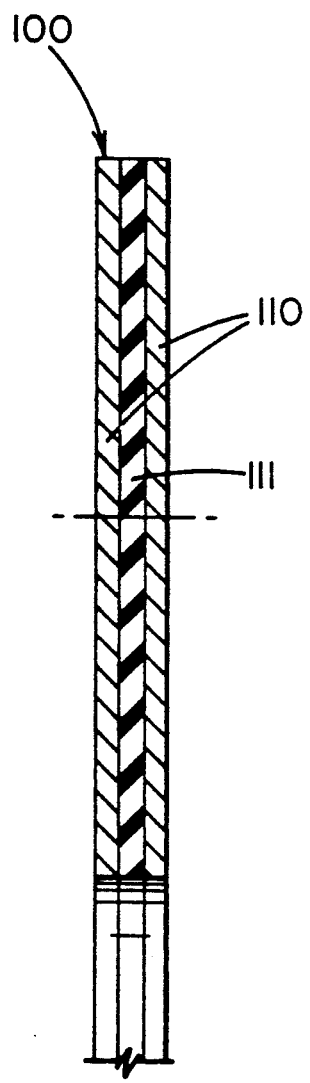
FIG. 7 is an enlarged cross-sectional view of one-half of a single laminate annular disc of steel-rubber-steel.
Figure 8:
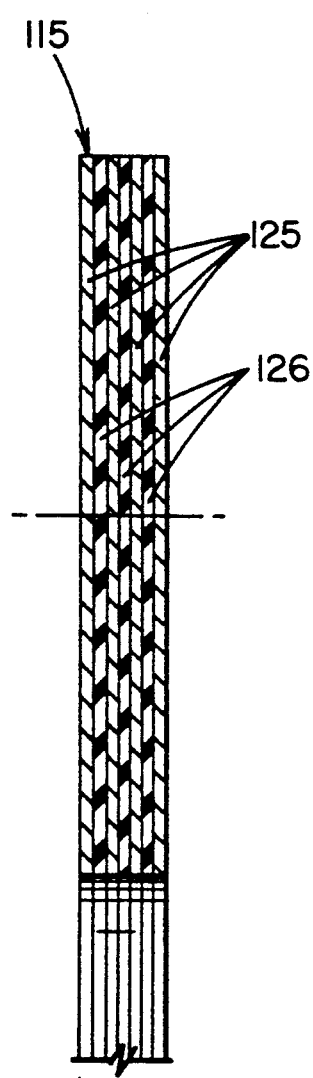
FIG. 8 is an enlarged cross-section view of one-half of a multi-layered laminate disc.

The annular viscoelastic solid elastic deformable disc or plate 38 is operative to reduce vibration during the braking operation. The annular viscoelastic plate dampens vibration via its internal structure which helps to dissipate mechanical energy into heat contrasting to the use of a material where internal shear friction is induced to dampen vibration but the material abrades. This is a significant difference. Materials used in the dampening process of the annular discs can be a laminate of a steel-rubber-steel layered construction, a metal construction other than steel or a polymer such as an elastic silicone rubber of methyl phenyl silicone type or a laminate with one or more layers of a viscoelastic polymer which can be ethylene, vinyl acetate and acrylic and/or methacrylic acid. FIG. 7 illustrates a single laminate annular disc or ring 100 similar to disc 38 composed of two rigid layers or thin sheets 110 which may be formed of steel which are separated by a thin layer of viscoelastic material 111 whereas FIG. 8 depicts a multi-layer laminate disc 115 similar to disc 38 which is composed of a plurality of rigid layers or thin sheets 125 which may be formed of steel, which sheets are separated by thin viscoelastic layers 126. Elastic deformable as used herein to describe the plate 38 means its capability of recovering size and shape after the deformation while dissipating the mechanical energy into heat without any material abrading. Such described viscoelastic plate 38 dampens vibration and is to be distinguished from a heat shield which can be employed adjacent to plate 38 but which performs a completely different function.

Figure 4:
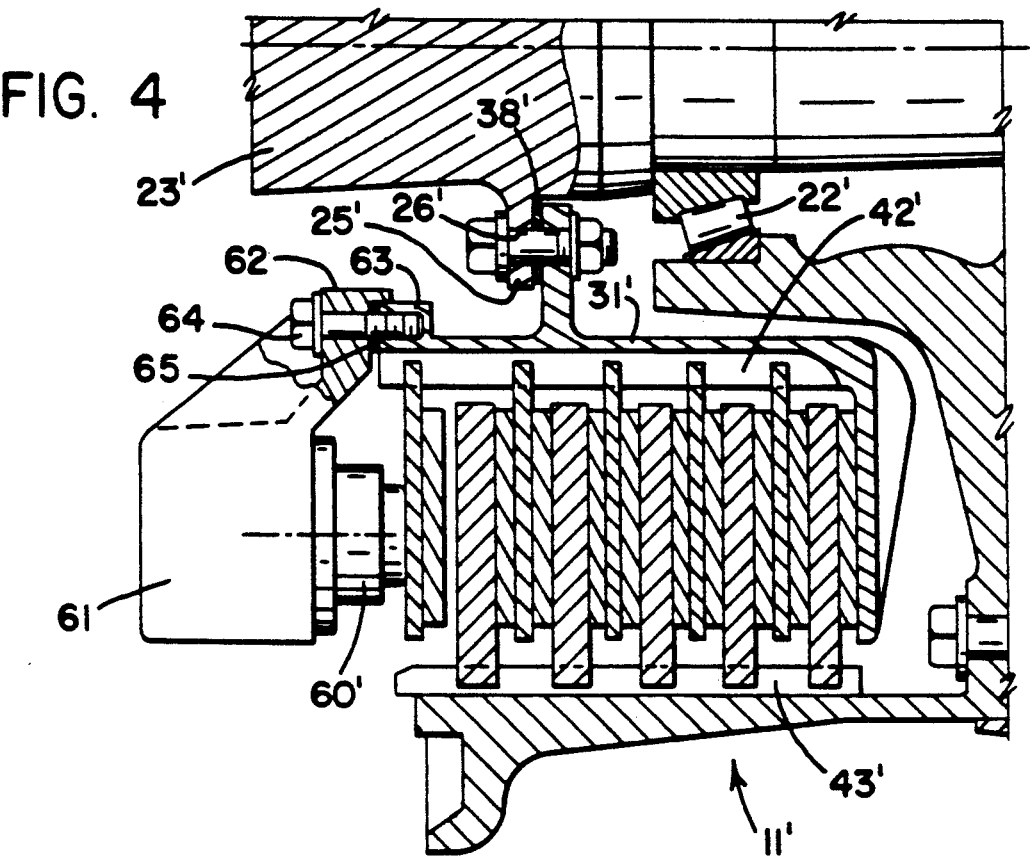
FIG. 4 is a fragmentary cross-sectional view of a brake assembly embodying a modification of the invention.

A modification of the invention is shown in FIG. 4 wherein a cylindrical wheel 11' is suitably supported for rotation on bearings 22', which bearings are mounted on a nonrotatable axle member 23'. A torque flange 25' as disclosed in the first embodiment is integral with the axle member 23'. Torque flange 25' has a plurality of circumferentially spaced bores 26' to provide means for securing such flange 25' to an annular flange of a torque tube member or torque tube 31'. Such annular flange of torque tube 31' has a plurality of circumferentially spaced bores in alignment with the bores 26' on torque flange 25'.

An annular disc or plate member 38' identical to plate member 38 of the first embodiment is interposed between the torque flange 25' and the flange of the torque tube 31' and is fastened thereto to dampen vibration.

Torque tube 31' has a plurality of circumferentially spaced splines or spline members 42' which are axially extending wheel 11' has a plurality of circumferentially spaced ribs or splines 43' on its inner peripheral surface, which may be cast therein or may be machined to provide integral ribs or splines for the brake assembly.

Spline member 42' of torque tube 31' supports a plurality of stators or nonrotatable discs while ribs 43' support a plurality of rotors or rotatable discs interleaved with the stators forming a brake stack as previously described in the first embodiment. Such stator and rotor discs are made from a suitable brake material for withstanding high temperatures.

The actuating mechanism for the brake includes a plurality of circumferentially spaced cylinders 60' mounted on a piston housing support 61 which has an annular hub 62 in alignment with a hub 63 on the torque tube 31'. Such annular hub 62 and hub 63 have circumferentially spaced bores that are in alignment to receive bolts 64 to secure such hubs together. Interposed between the respective hubs 63 and 62 is an annular disc or plate member 65 identical to the plate member 38 of the first embodiment and fastened therebetween by bolts 64 to dampen vibration.

Figure 5:
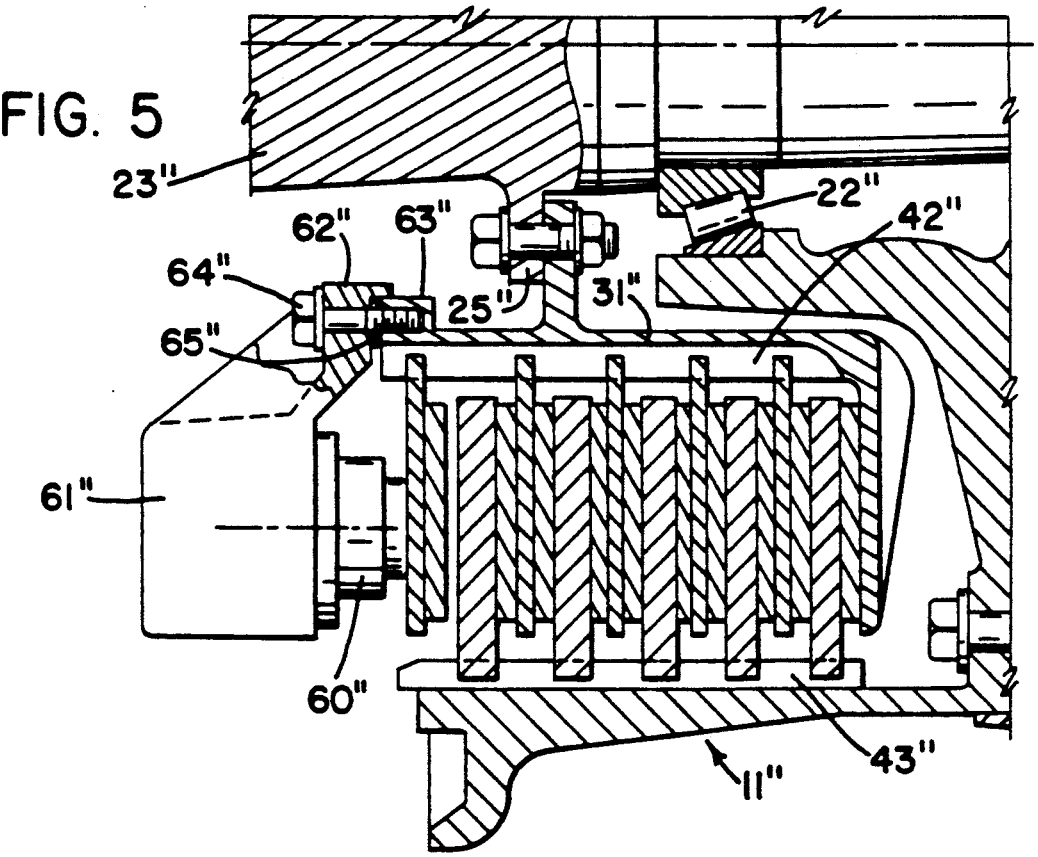
FIG. 5 is a fragmentary cross-sectional view of a brake assembly embodying a further modification of the invention.

A further modification of the invention is shown in FIG. 5 wherein the brake assembly structure is substantially identical to the two previously described embodiments except for the location of the dampening means.

In this embodiment (FIG. 5) a cylindrical wheel 11" is suitably supported for rotation on bearings 22", which bearings are mounted on a nonrotatable axle member 23". A torque flange 25" as disclosed in the first embodiment is integral with the axle member 23". Torque flange 25" has a plurality of circumferentially spaced bores to provide means for securing such flange 25" to an annular flange of a torque tube member or torque tube 31" by bolts.

Torque tube 31" has a plurality of circumferentially spaced splines 42" which are axially extending. Wheel 11" has a plurality of circumferentially spaced ribs or splines 43" on its inner peripheral surface, which may be cut therein to provide integral ribs or splines for the brake assembly.

Spline members 42" of torque tube 31" support a plurality of stator or nonrotatable discs while ribs 43" support a plurality of rotors or motor discs interleaved with the stators forming a brake stack as previously described in the first embodiment. Such stator and rotor discs are made from a suitable brake material for withstanding high temperatures.

The actuating mechanism for the brake includes a plurality of circumferentially spaced cylinders 60" mounted on a piston housing support 61" which has an annular hub 62" in alignment with a hub 63" on the torque tube 31". Such annular hub 62" and hub 63" have circumferentially spaced aligned bores to receive bolts 64" to secure such hubs together. Interposed between the respective hubs 62" and 63" is an annular disc or plate member 65" identical to the plate member 38 of the first embodiment and fastened therebetween by bolts 64" to dampen vibration. Such Plate member 65" is made from a solid non-consumed single layer non-laminate or a solid non-consumed multi-layered laminate of viscoelastic material that dampens vibration and is to be distinguished from a heat shield, which heat shield can be employed in addition to the plate member 65" but which performs a completely different function.

Figure 6:
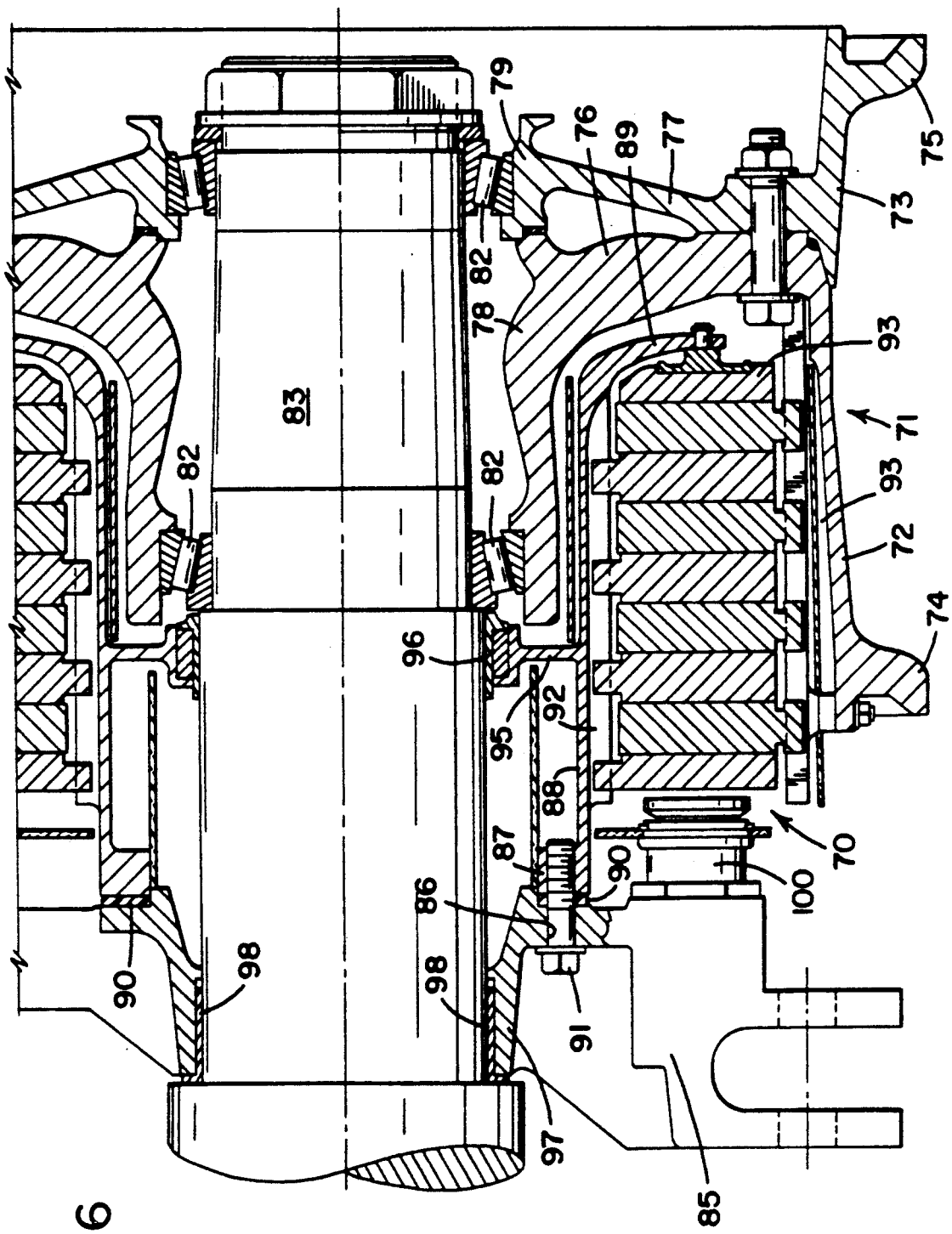
FIG. 6 is a fragmentary cross-sectional view of a modified brake assembly embodying the invention mounted on an aircraft installation.

A further modification of the invention is shown in FIG. 6 wherein there is shown in FIG. 6 a friction brake mechanism 70 for use with a cylindrical wheel 71 having matching wheel sections 72 and 73. Each of the wheel sections 72 and 73 has a rim member 74 and 75, web member 76 and 77, and hub members 78 and 79. The wheel sections 72 and 73 are fastened together by suitable bolts disposed in aligned bores within web members 76 and 77 to form an integral unit therewith.

The hub members 78 and 79 are supported for rotation on bearings 82 which are mounted on a nonrotatable axle member 83. Mounted on an axle member 83 is a piston housing 85. Piston housing 85 is an annular hub in configuration with a plurality of circumferentially spaced bores 86 on its radial inner portion to provide means for securing such piston housing to a torque tube member to be described. Piston housing 85 supports and is connected to an annular flange or hub 87 of a cylindrical torque tube member or torque tube 88, which torque tube member 88 has an annular and radially outwardly extending reaction plate or reaction member 89. Such annular flange 87 has a plurality of circumferentially spaced bores which are in alignment with the bores 86 on piston housing 85. The reaction plate 89 may be made integral with the torque tube member 88 or may be made as a separate annular piece and suitably connected to the torque tube or torque tube member 88.

An annular disc or plate member 90 made from a solid non-consumed single layer non-laminate or a solid non-consumed multi-layered laminate of viscoelastic material is received between the annular flange or hub 87 and the piston housing 85. Such disc 90 is identical to the plate member 38 of the first embodiment. Annular disc 90 has a plurality of circumferentially spaced bores in alignment with bores 86 of the piston housing 85 such as to facilitate the reception of bolts 91 that extend through these bores 86 to interconnect the piston housing 85 with annular flange 87 of cylindrical torque tube member 88.

Torque tube 88 has a plurality of circumferentially spaced splines or spline members 92 which are axially extending. Wheel section 72 has a plurality of circumferentially spaced ribs or splines 93 on its inner peripheral surface, which may be cast therein or may be machined to provide an integral type rib or spline for the brake assembly.

Spline members 92 support a plurality of axially aligned nonrotatable or stator discs which have slotted openings at circumferentially spaced locations on the inner periphery for captive engagement by the spline members 42 as is old and well known in the art. An annular disc or annular braking element 93 is suitably adhered to the inner surface of the reaction plate 89 and acts in concert with the above referred to stator discs.

A plurality of axially spaced rotor brake discs are interspaced or interleaved between the above referred to stator discs which have circumferentially spaced openings along their outer Periphery for engagement by the corresponding ribs 93 as is old and well known in the art. All of the nonrotatable discs, annular disc 93, and rotatable discs may be made from a suitable brake material such as metal, steel or other wear-resistant material for withstanding high temperatures and providing a heat sink. The number of discs may be varied as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots as is old and well known in the art. Such reinforcing inserts are also referred to as drive clips.

The torque tube 88 has a circumferentially extending foot or rib 95 extending radially inwardly therefrom, having mounted thereon a bushing 96 to provide additional support between the axle 83 and the torque tube 88. In addition a flange 97 on the inner periphery of piston housing 85 has a bushing 98 mounted thereon to additionally support the axle 83.

The actuating mechanism for the brake includes a plurality of circumferentially spaced cylinders 100 suitably mounted on the piston housing 85. Within each of the cylinders 100 is a hydraulic piston connected to piston rod which is operative to move the stator disc axially into and out of engagement with the rotor discs to frictional engage their radial surfaces and are resisted by the end stationary annular disc 93 and the reaction plate 89 on torque tube 88. During this period of brake disc engagement the friction forces among all the rotatable and non-rotatable discs may cause vibration within the discs and the adjacent structures unless dampened. It is the frictional engagement of these stator and rotor discs which produces the braking action for the aircraft wheel.

The annular viscoelastic solid elastic deformable disc or plate 90 is operative to reduce vibration during the braking operation. The annular viscoelastic plate dampens vibration via its internal structure which helps to dissipate mechanical energy into heat contrasting to the use of a material where internal shear friction is induced to dampen vibration but the material abrades. This is a significant difference. Materials used in the dampening process of the annular discs can be a laminate of a steel-rubber-steel layered construction, a metal construction other than steel or a polymer such as an elastic silicone rubber of methyl phenyl silicone type or a laminate with one or more layers of a viscoelastic polymer which can be ethylene, vinyl acetate and acrylic and/or methacrylic acid. Elastic deformable as used herein to describe the plate 90 means its capability of recovering size and shape after the deformation while dissipating the mechanical energy into heat without any material abrading.

It will be apparent that, although a specific embodiment and certain modifications of the invention have been described in detail, the invention is not limited to the specifically illustrated and described constructions since variations may be made without departing from the principles of the invention.

I claim:

1. In an aircraft multiple disc and brake assembly having an axle with a central axis of rotation; bearing means mounted on said axle; a rotatable cylindrical wheel member journaled on said bearing means; said cylindrical wheel member having an inner peripheral circumferentially extending portion and a radially disposed web portion for mounting on said bearing means for rotation thereon; said inner peripheral portion has a plurality of circumferentially spaced splines; a plurality of axially spaced rotor discs mounted on said axle and keyed to said splines for rotation therewith; said axle having a circular flange; a torque tube mounted on said axle to encompass a portion thereof; said torque tube having a flange lying closely adjacent to said circular flange; and torque tube having a plurality of axially extending ribs; a plurality of stator discs with circumferentially spaced slots engaging said ribs for axial movement thereon; said rotor discs interleaved between said stator disc to define a brake stack; motive means operative for moving said discs axially into frictional engagement with each other to provide a braking action to said cylindrical wheel member; an energy dissipating annular plate for dampening vibration and converting mechanical energy into heat energy mounted between said circular flange and said flange of said torque tube to abuttingly engage said circular flange and said flange of said torque tube and to completely isolate said circular flange and axle from said brake stack; means extending through and rigidly securing together said circular flange, said flange of said torque tube and said energy dissipating annular plate; and said annular plate being made from a viscoelastic material operative to convert mechanical energy into heat energy and to dampen vibration between said circular flange and said flange of said torque tube during frictional engagement of said stator discs and said rotor discs during braking action.

2. In an aircraft multiple disc and brake assembly as set forth in claim 1 wherein the axial clearance space radially inwardly and radially outwardly of said annual plate between said circular flange and said flange of said torque tube is in the range of 0.100 inches to 0.001 inches.

3. In an aircraft multiple disc and brake assembly as set forth in claim 1 wherein the thickness of said energy dissipating annular plate is approximately 0.050 inches.

4. In an aircraft multiple disc and brake assembly as set forth in claim 1 wherein said annular plate is a solid multi-layered non-consumed laminate that dissipate energy by converting mechanical energy into heat.

5. In an aircraft multiple disc and brake assembly as set forth in claim 4 wherein said solid multi-layered laminate contains an elastic deformable member that returns to its original shape.

6. In an aircraft wheel and brake assembly having a fixed axle with a circular flange thereon, bearing means mounted on said axle; a wheel support mounted on said bearing means for rotation relative to said axle; a resilient deformable annular plate mounted on said circular flange for dissipating mechanical energy into heat; said annular plate having a pair of spaced annular surfaces with one surface abuttingly engaging said circular flange; a torque tube with an annular flange; the other one of said surfaces of said annular plate abuttingly engaging said annular flange of said torque tube; a plurality of circumferentially spaced bolts interconnecting said circular flange, said annular plate and said annular flange; said torque tube having an end reaction plate; said torque tube having a plurality of circumferentially spaced splines; a plurality of stator discs having circumferentially spaced recesses for engagement with said splines on said torque tube for axial movement thereon; a plurality of rotor discs mounted on said wheel support for rotation therewith and for axial movement thereon; said rotor discs interleaved with said stator discs; power means mounted on said circular flange for moving said stator discs and said rotor discs toward each other to effect a braking; and said annular plate being a solid elastic deformable member of viscoelastic material that yields but recovers its shape and form while dissipating mechanical energy into heat energy.

7. In an aircraft wheel and brake assembly as set forth in claim 6 wherein said annular plate is a solid elastic deformable multi-layered laminate that dampens vibration.

8. In an aircraft wheel and brake assembly as set forth in claim 6 wherein said annular plate is a thin viscoelastic member providing a narrow gap radially inwardly and radially outwardly of said plate between said circular flange and said annular flange of said torque tube to physically isolate said flanges.

9. In an aircraft multiple disc and brake assembly having an axle with a central axis; a stationary hub member and torque tube member secured to said axle; bearing means mounted on said axle; a cylindrical wheel member having an outer portion for the mounting of a tire thereon and an inner portion for mounting on said bearing means for rotation thereon; said cylindrical wheel having a plurality of circumferentially spaced splines; a plurality of axially spaced rotor discs mounted on said axle and keyed to said splines for rotation therewith; said torque tube member having a plurality of axially extending ribs; a plurality of stator discs with circumferentially spaced slots engaging said ribs for axial movement thereon; said rotor discs interleaved between said stator discs; power means mounted on said torque tube member and operative upon actuation to move said discs axially into frictional engagement with each other to effect a braking action; an annular energy converting dampening plate mounted between said hub member and said torque tube member to isolate said hub member's connection with said torque tube member; fastening means interconnecting said annular energy converting dampening plate to said hub portion and said torque tube member; and said annular energy converting dampening plate being made from a viscoelastic material that returns to its original shape on deformation to convert and dissipate mechanical energy into heat energy for dampening vibration during frictional engagement of said stator discs and said rotor discs during braking action.

10. In an aircraft wheel and brake assembly having a fixed axle with a circular flange thereon, bearing means mounted on said axle; a wheel support mounted on said bearing means for rotation relative to said axle; an annular energy converting and energy dissipating plate mounted on said circular flange that is yieldable under vibration and recoverable to its original shape and size during operation; said annular energy converting and energy dissipating plate having a pair of spaced annular surfaces with one of said surface abuttingly engaging said circular flange; a torque tube with an annular flange; the other one of said surfaces of said annular energy converting and energy dissipating plate abuttingly engaging said annular flange of said torque tube; a plurality of circumferentially spaced bolts interconnecting said circular flange, said annular energy converting and energy dissipating plate and said annular flange; said torque tube having an end reaction plate; said torque tube having a plurality of circumferentially spaced splines; a plurality of stator discs having circumferentially spaced recesses for engagement with said splines on said torque tube for axial movement thereon; a plurality of rotor discs mounted on said wheel support for rotation therewith and for axial movement thereon; said rotor discs interleaved with said stator discs; said torque tube having an annular hub; an annular energy converting and energy dissipating dampening member mounted on said annular hub that is yieldable under vibration and recoverable to its original shape and size during shearing operation internally; said annular energy converting and energy dampening member having a pair of spaced annular surfaces with one of said surfaces abuttingly engaging said annular hub; a piston housing having a surface thereon in abutting contact with the other one of said annular surfaces of said annular energy converting and energy dampening member, bolt means extending through said annular energy converting and energy dampening member securing said annular hub to said piston housing; power means mounted on said piston housing for moving said stator discs and said rotor discs toward each other to effect a braking action therebetween; and said annular energy converting and dissipating member being a solid elastic deformable member of viscoelastic material operative to dampen vibration by dissipating mechanical energy into heat energy.

11. In an aircraft multiple disc and brake assembly having an axle with a central axis; bearing means mounted on said axle; a cylindrical wheel member journaled on said bearing means, said cylindrical wheel member having an inner peripheral circumferentially extending portion and radially disposed web portion for mounting on said bearing means for rotation thereon; said inner peripheral portion has a plurality of circumferentially spaced splines; a plurality of axially spaced rotor discs mounted on said axle and keyed to said splines for rotation therewith; a stationary housing means mounted on said axle for supporting a torque tube which encompasses a portion of said axle; said torque tube having a plurality of axially extending ribs; a plurality of stator discs with circumferentially spaced slots engaging said ribs for axial movement of said stator discs; said rotor discs interleaved between said stator discs to define a brake stack; means mounted on said housing means for moving said discs axially into frictional engagement with each other; an energy converting dampening plate mounted between and abutting said housing means and said torque tube; fastening means interconnecting said torque tube to said housing means through said energy converting dampening plate to rigidly secure said torque tube and said housing means together to thereby mechanically isolate said brake stack from said housing means; and said energy converting dampening plate being made from a viscoelastic material to convert and dissipate mechanical energy into heat energy while dampening vibration during frictional engagement of said stator discs and said rotor discs during braking action.

* * * * *